(12) United States Patent
Zhu et al.

(10) Patent No.: US 11,950,142 B2
(45) Date of Patent: Apr. 2, 2024

(54) METHOD AND APPARATUS FOR SENDING SYSTEM PERFORMANCE PARAMETERS, MANAGEMENT DEVICE, AND STORAGE MEDIUM

(71) Applicant: ZTE CORPORATION, Guangdong (CN)

(72) Inventors: Weihong Zhu, Guangdong (CN); Hua Ni, Guangdong (CN)

(73) Assignee: ZTE CORPORATION (CN)

( * ) Notice: Subject to any disclaimer, the term of this patent is extended or adjusted under 35 U.S.C. 154(b) by 28 days.

(21) Appl. No.: 17/767,933

(22) PCT Filed: Sep. 28, 2020

(86) PCT No.: PCT/CN2020/118336
§ 371 (c)(1),
(2) Date: Apr. 11, 2022

(87) PCT Pub. No.: WO2021/073413
PCT Pub. Date: Apr. 22, 2021

(65) Prior Publication Data
US 2023/0247490 A1 Aug. 3, 2023

(30) Foreign Application Priority Data
Oct. 14, 2019 (CN) .......... 201910974404.3

(51) Int. Cl.
*H04W 28/24* (2009.01)
*H04L 41/5009* (2022.01)
(Continued)

(52) U.S. Cl.
CPC .......... *H04W 28/24* (2013.01); *H04L 41/5009* (2013.01); *H04L 43/06* (2013.01); *H04L 43/0888* (2013.01)

(58) Field of Classification Search
CPC ..... H04W 28/24; H04L 41/5009; H04L 43/06
See application file for complete search history.

(56) References Cited

U.S. PATENT DOCUMENTS 6,055,493 A * 4/2000 Ries .................... H04L 41/5032
709/224
9,705,751 B1 * 7/2017 Yi .......................... H04L 41/145
(Continued)

FOREIGN PATENT DOCUMENTS

| CN | 103188119 | 7/2013 |
|----|-----------|--------|
| CN | 103220164 | 7/2013 |

(Continued)

OTHER PUBLICATIONS

Patent Cooperation Treaty (PCT), International Search Report and Written Opinion for Application PCT/CN2020/118336 filed on Sep. 28, 2020, dated Jan. 4, 2021, International Searching Authority, CN.
(Continued)

*Primary Examiner* — Jimmy H Tran
(74) *Attorney, Agent, or Firm* — McDonald Hopkins LLC

(57) ABSTRACT

Provided are a method and apparatus for sending system performance parameters, a management device, and a storage medium. The method for sending system performance parameters includes determining system performance parameters which include key performance indicator (KPI) information and confidence of the KPI information; and sending the system performance parameters.

11 Claims, 3 Drawing Sheets

Determine system performance parameters, where the system performance parameters include key performance indicator (KPI) information and confidence of the KPI information — S110

Send the system performance parameters — S120

(51) Int. Cl.
*H04L 43/06* (2022.01)
*H04L 43/0888* (2022.01)

(56) References Cited

U.S. PATENT DOCUMENTS

| | | | |
|---|---|---|---|
| 2006/0020923 A1* | 1/2006 | Lo | G06F 11/0709 |
| | | | 714/E11.197 |
| 2008/0016412 A1* | 1/2008 | White | H04L 41/0631 |
| | | | 714/48 |
| 2009/0164173 A1* | 6/2009 | Gupta | H04L 43/106 |
| | | | 702/186 |
| 2010/0302954 A1* | 12/2010 | Tirpak | H04L 43/065 |
| | | | 706/50 |
| 2011/0078300 A9* | 3/2011 | Grelewicz | G06F 11/3428 |
| | | | 709/224 |
| 2013/0166730 A1* | 6/2013 | Wilkinson | H04L 43/0852 |
| | | | 709/224 |
| 2014/0120930 A1* | 5/2014 | Harris | H04L 41/5009 |
| | | | 455/422.1 |
| 2014/0220998 A1* | 8/2014 | Kovacs | H04L 41/5009 |
| | | | 455/453 |
| 2014/0336984 A1* | 11/2014 | Starr | G05B 23/0297 |
| | | | 702/183 |
| 2015/0095117 A1* | 4/2015 | Hariharan | G06Q 10/06393 |
| | | | 705/7.39 |
| 2015/0095119 A1 | 4/2015 | Hariharan et al. | |
| 2015/0181022 A1* | 6/2015 | Vaderna | H04L 41/5003 |
| | | | 455/422.1 |
| 2016/0065419 A1* | 3/2016 | Szilagyi | H04L 43/08 |
| | | | 709/224 |
| 2016/0065420 A1* | 3/2016 | Burton | H04L 41/5067 |
| | | | 709/224 |
| 2016/0157114 A1* | 6/2016 | Kalderen | H04W 24/08 |
| | | | 370/252 |
| 2017/0086084 A1* | 3/2017 | Jarvis | H04M 3/2236 |
| 2017/0262781 A1* | 9/2017 | Yang | G06Q 10/06393 |
| 2017/0302553 A1* | 10/2017 | Zafer | H04L 43/08 |
| 2017/0332303 A1* | 11/2017 | Sunay | H04W 8/22 |
| 2018/0139116 A1* | 5/2018 | Ricci | H04L 41/14 |
| 2018/0270126 A1* | 9/2018 | Tapia | H04L 43/065 |
| 2020/0059417 A1* | 2/2020 | De Buitleir | H04L 43/16 |
| 2020/0059805 A1* | 2/2020 | Kwan | H04L 41/16 |
| 2020/0175445 A1* | 6/2020 | Prabhakar | G06Q 10/0635 |
| 2020/0371901 A1* | 11/2020 | Sastry | G06F 11/3692 |
| 2021/0105193 A1* | 4/2021 | Chong | H04L 41/5067 |
| 2021/0135954 A1* | 5/2021 | Boyle | G06F 18/2148 |
| 2021/0218679 A1* | 7/2021 | Chong | H04L 47/24 |

FOREIGN PATENT DOCUMENTS

| | | |
|---|---|---|
| CN | 106941690 | 7/2017 |
| CN | 110719604 | 1/2020 |
| EP | 2611074 A1 | 7/2013 |
| EP | 2611084 A1 | 7/2013 |
| KR | 10-2004-0073226 A | 6/2004 |

OTHER PUBLICATIONS

Extended European Search Report for Application 20875734.4, PCT/CN2020118336, dated Oct. 17, 2023, 8 pgs., European Patent Office, Germany.

Korean Patent Office, Office action for Application No. 10-2022-7016086, dated Sep. 4, 2023, 6 pages, Korea.

* cited by examiner

METHOD AND APPARATUS FOR SENDING SYSTEM PERFORMANCE PARAMETERS, MANAGEMENT DEVICE, AND STORAGE MEDIUM

This application is a U.S. National Stage Application, filed under 35 U.S.C. 371 of International Patent Application No. PCT/CN2020/118336 filed on Sep. 28, 2020, which claims priority to Chinese Patent Application No. 201910974404.3 filed with the China National Intellectual Property Administration (CNIPA) on Oct. 14, 2019, the disclosure of which are incorporated herein by reference in their entireties.

TECHNICAL FIELD

The present application relates to the field of communication, for example, a method and apparatus for sending system performance parameters, a management device, and a storage medium.

BACKGROUND

Mobile communication technology has entered the era of the fifth-generation (5G) mobile communication technology. The management of a 5G network includes basic management functions such as configuration, performance, and alarms. In terms of performance management, performance measurement data may be sent at short intervals to reflect system performance in real time. In addition, a key performance indicator (KPI) calculated according to the performance measurement data is also an important indicator reflecting the system performance.

However, when the performance measurement data is collected in an actually running network, usually, the performance measurement data of some network elements (or some network functions) in certain time periods cannot be collected due to various reasons, that is, the integrity of the performance measurement data cannot be guaranteed. In a method of calculating the KPI according to the performance measurement data, a case where the performance measurement data may be missing is not considered, resulting in relatively poor accuracy of the obtained KPI, thereby failing to accurately reflect the system performance.

SUMMARY

The present application provides a method and apparatus for sending system performance parameters, a management device, and a storage medium.

An embodiment of the present application provides a method for sending system performance parameters. The method includes the following.

System performance parameters are determined, where the system performance parameters include key performance indicator (KPI) information and confidence of the KPI information.

The system performance parameter is sent.

An embodiment of the present application provides an apparatus for sending system performance parameters. The apparatus includes a determination module and a sending module.

The determination module is configured to determine system performance parameters, where the system performance parameters include key performance indicator (KPI) information and confidence of the KPI information.

The sending module is configured to send the system performance parameters.

An embodiment of the present application provides a management device. The management device includes one or more processors and a storage apparatus configured to store one or more programs.

The one or more programs are executed by the one or more processors to cause the one or more processors to perform any method provided in embodiments of the present application.

An embodiment of the present application provides a storage medium for storing computer programs which, when executed by a processor, perform any method provided in the embodiments of the present application.

DETAILED DESCRIPTION

Embodiments of the present application are described hereinafter in detail in conjunction with drawings. It is to be noted that if not in collision, embodiments of the present application and features therein may be combined with each other in any manner.

The steps illustrated in the flowcharts among the drawings may be performed by, for example, a computer system capable of executing a set of computer-executable instructions. Moreover, although logical sequences are illustrated in the flowcharts, the steps illustrated or described may be performed in sequences different from those described here in some cases.

Figure 1:
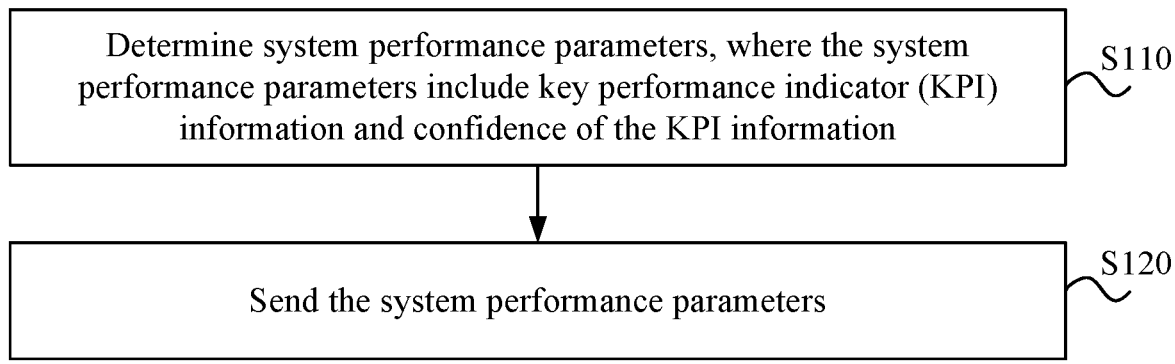
FIG. 1 is a flowchart of a method for sending system performance parameters according to an embodiment of the present application.

In an example embodiment, FIG. 1 is a flowchart of a method for sending system performance parameters according to an embodiment of the present application. The method may be applicable to a case of determining and sending system performance parameters. The method may be performed by an apparatus for sending system performance parameters. The apparatus may be implemented by software and/or hardware and integrated on a management device. The management device may be a device that manages the performance of network elements involved. For example, the management device may calculate KPI information based on involved network elements.

The method for sending system performance parameters provided in the present application may be considered as a management method for a wireless communication system, for example, a management method for a 5G network in the field of communication is related.

Mobile communication technology has entered the 5G era, and a network slice is an important part of 5G. The network slice mainly refers to an instantiated complete logical network with specific network characteristics composed of a set of network functions (including network resources supporting the network functions), where the logical network is used for satisfying requirements of a certain type of specific network. Examples of the network characteristics here are ultra-low latency, ultra-high reliability and the like.

In the case where a network slice is complex, to facilitate management, the network slice may be decomposed into network slice subnets. A network slice subnet refers to a logical network with specific network characteristics composed of a set of network functions and network resources supporting the network functions. A network slice may include 0, 1 or more network slice subnets. The management and arrangement of the network slice subnets are completed by a network slice subnet management function (NSSMF). The NSSMF completes the instantiation of the network slice subnets and the control and management of life cycles of the network slice subnets according to the definition of the blueprint of the network slice subnets.

Figure 2:
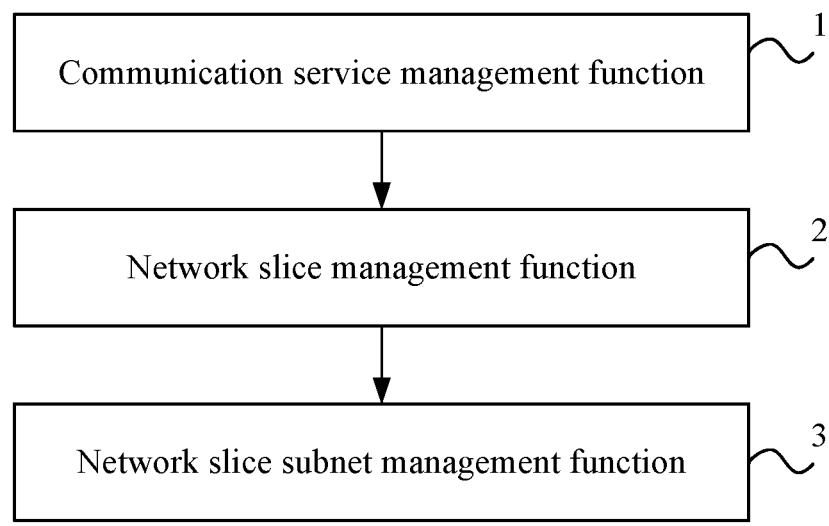
FIG. 2 is a diagram of a 5G network management hierarchy according to an embodiment of the present application.

For the 5G network, the network slice is to provide support for specific communication services. Therefore, from the perspective of the management of the entire 5G network slice, a communication service management function (CSMF) is further included so that the management of the 5G network slice is divided into three layers: CSMF-network slice management function (NSMF)-NSSMF. FIG. 2 is a diagram of a 5G network management hierarchy according to an embodiment of the present application. FIG. 2 shows the 5G network management hierarchy, which includes a CSMF 1, an NSMF 2 and an NSSMF 3.

The management of the 5G network may also include basic management functions such as configuration, performance, and alarms, but may be improved or enhanced according to new management requirements. In terms of performance management, a concept of performance data streaming, that is, real-time performance data, that is, performance measurement data may be reported at short intervals to reflect system performance in real time. The management device in the present application may receive the reported system performance data, so as to determine the system performance parameters that can reflect the system performance.

For 5G network performance management, the KPI calculated according to the performance measurement data is an important indicator to reflect the system performance. For the definition of the KPI of the 5G network, reference may be made to 3GPP TS 28.554; and for the definition of the KPIs related to other mobile networks, reference may be made to 3GPP TS 32.410, TS 32.450, TS 32.454, and TS 32.455.

In the case of real-time reporting of the performance measurement data through data streaming, if KPIs may be generated in real time at the same time, a performance state of the 5G network system may also be reflected in a more timely manner. When the performance measurement data is collected in an actually running network, usually, data of some network elements in certain time periods cannot be collected due to various reasons so that the integrity of the data cannot be guaranteed The method for sending system performance parameters provided in the present application can effectively ensure the accuracy of the calculated KPI. As shown in FIG. 1, a method for sending system performance parameters provided in the present application includes S110 and S120.

In S110, system performance parameters are determined, where the system performance parameters include KPI information and confidence of the KPI information.

The system performance parameters may be understood as parameters that can reflect system performance. The system may be composed of a management device and network elements involved in the management device, the management device may manage at least one network element in a subnet or a slice, and the managed network element may be considered as a network element involved in the management device. The system performance parameters include at least, but are not limited to, the performance measurement data, the KPI information, or the confidence corresponding to the KPI information. The performance measurement data may be data reflecting performance sent by a network element or a network function to a management device, such as data reflecting network performance. The KPI information may include values obtained by calculating the KPI through a KPI calculation formula.

When the management device determines the KPI information, which performance measurement data needs to be used for the KPI information to be calculated may be detected first, for example, specific content included in the performance measurement data is determined; which network element is involved in the calculation of the KPI information needs to be further determined. Then, the performance measurement data sent by a corresponding network element is received. In the present application, the integrity of the received performance measurement data is identified through the confidence, thereby identifying the accuracy of the KPI information calculated based on the performance measurement data.

A specific method for determining the KPI information is not limited here, and a calculation formula of the KPI information may be set in the definition of the KPI. Exemplarily, the KPI information may be calculated according to the calculation formula of the KPI information and a time window for calculating the KPI.

In the case where the performance measurement data required for calculating the KPI information is incomplete, for example, some network elements do not send the performance measurement data, in the present application, the performance measurement data of the network element may be supplemented, for example, missing data is determined and used as the performance measurement data sent by the network element. Therefore, the performance measurement data may include data obtained from the network element and may also include the missing data. In the case of calculating the KPI information, calculation may be performed based on the performance measurement data including the missing data or may be performed based on the performance measurement data received from the network element.

To ensure that a user who uses the KPI information has a better understanding of the accuracy of the KPI information, in the present application, the confidence of the KPI information may be determined. The confidence may identify the accuracy of the KPI information, and a method for determining the confidence is not limited here. For example, the confidence is determined by the integrity of the performance measurement data. For another example, the confidence is determined through a ratio of the performance measurement data that is not received and is supplemented through the missing data to the performance measurement data received directly from the network element. For another example, a method of supplementing the missing data also affects the confidence of the KPI information. For example, confidence of data supplemented through a mean of adjacent data may be higher than confidence of data supplemented through a default value. The adjacent data may be the performance measurement data of the network element corresponding to the missing data collected before or after a collection time of the missing data. For example, the performance measurement data reported for the first n times by the network element of the missing data or the performance measurement data reported for the last m times by the network element of the missing data is determined. n and m may be positive numbers.

In S120, the system performance parameters are sent.

After the system performance parameters are determined, in the present application, the system performance parameters are sent to other devices. The other devices are not limited here, as long as the other devices have an authority to know system performance of a system corresponding to a management device. For example, the system performance parameters are sent to a superior manage device or other network elements. Other devices may more accurately understand and apply the KPI information based on the KPI information in the system performance parameters and the confidence corresponding to the KPI information.

Exemplarily, assuming that the KPI information needs to be calculated at a slice level, the NSMF (which may be located in a slice management device) first checks which performance measurement data are required to be used by the KPI information to be calculated and which network elements are involved, it needs to be ensured that a task of collecting corresponding performance measurement data has been started (that is, the task of collecting the performance measurement data is to collect the corresponding performance measurement data), and then the KPI information is calculated.

Assuming that an uplink throughput of a slice instance needs to be calculated at the slice level, the uplink throughput of all user port function (UPF) network functions (which may be regarded as network elements) under the slice instance needs to be used. Therefore, the NSMF of the slice instance needs to check whether an uplink throughput performance measurement task of the relevant UPF already exists, and the measurement task is created if the measurement task does not exist; the uplink throughput of each UPF, that is, the performance measurement data, is collected through the relevant performance measurement task; and then the NSMF performs the calculation of the KPI information in a preset time (that is, a sum of the uplink throughput of each UPF is calculated, and the missing data may also be supplemented before the calculation).

It is to be understood that a cycle for calculating the KPI information may be greater than or equal to a cycle for collecting the performance measurement data, and the cycle for calculating the KPI information may be N times the cycle for collecting the performance measurement data, where N is a positive integer.

The present application provides a method for sending system performance parameters. The method includes determining system performance parameters, where the system performance parameters include KPI information and confidence of the KPI information; and sending the system performance parameters. In this manner, the KPI information may be more accurately determined, thereby helping other devices to determine the system performance of the system corresponding to the management device.

On the basis of the preceding embodiments, variant embodiments of the preceding embodiment are provided. It is to be noted here that for ease of description, only differences from the preceding embodiments are described in the variant embodiments.

In an embodiment, determining the system performance parameters includes the following.

Performance measurement data is acquired.

The KPI information is determined according to the performance measurement data.

The confidence of the KPI information is determined.

In the present application, in the case where the system performance parameters are determined, the performance measurement data may be acquired first, where the performance measurement data may be performance measurement data sent by the network element in the system corresponding to the management device. The performance measurement data may be sent by the network element or may be sent by other network functions, which is not limited here. The performance measurement data to be acquired may be determined based on the calculated KPI information, such as a type of the performance measurement data that needs to be acquired when the management device detects and calculates the KPI information and the network element or network function of the performance measurement data that needs to be collected.

In the case where the performance measurement data is not successfully acquired, the determined missing data may be used as a supplement to the acquired performance measurement data so that the KPI information may be determined based on the performance measurement data including the missing data; the missing data may not be determined, and the KPI information is determined directly based on the performance measurement data that is successfully acquired.

In the case of determining the system performance parameters, the confidence of the KPI information may be determined based on the performance measurement data. Exemplarily, a number of real data actually acquired in the performance measurement data and a number of all data required for calculating the KPI information are determined so as to determine the confidence.

In the case where the missing data is not included in the performance measurement data, a number of acquired performance measurement data is directly determined to be the number of the real data actually acquired. In the case where the missing data is included in the performance measurement data, a number of data other than the missing data in the performance measurement data is determined to be the number of the real data actually acquired.

The technical means for determining the number of data other than missing data in the performance measurement data are not limited here. For example, the missing data may be stored separately, or identification information may be set for the missing data to identify the data as the missing data. Content of the identification information is not limited, as long as the identification information can be used for identifying the missing data.

In an embodiment, the performance measurement data includes the missing data, and the missing data is the performance measurement data that is not successfully acquired.

In the case where the performance measurement data is not successfully acquired, in the present application, the missing data may be used for supplementing the performance measurement data that is not successfully acquired, that is, the missing data is used as a supplement to the acquired performance measurement data. A method for determining the missing data is not limited, for example, the missing data may be missing data corresponding to the network element that fails to send the performance measurement data. Different network elements may correspond to different missing data.

In an embodiment, acquiring the performance measurement data includes in the case where the performance measurement data is not successfully acquired, determining the missing data according to data at a preset time, where the preset time includes at least one of the following: a first set time or a second set time, where the first set time is an acquisition time corresponding to the performance measurement data acquired before an acquisition time of the missing data; and the second set time is an acquisition time corresponding to the performance measurement data acquired after the acquisition time of the missing data.

In a process of determining the KPI information in the present application, performance measurement data of at least one network element may be acquired, that is, at least one performance measurement data is acquired. In the case where the performance measurement data is not successfully acquired, the missing data corresponding to the network element is determined according to data of the network element at a preset time, where the network element fails to acquire the performance measurement data.

In the present application, the missing data is determined according to data acquired at the preset time, that is, the performance measurement data. The acquisition time of the missing data may be considered as an acquisition time of the performance measurement data that is not successfully acquired corresponding to the missing data. A first time may be considered as the acquisition time corresponding to the acquired performance measurement data before the acquisition time of the performance measurement data that is not successfully acquired corresponding to the missing data, that is, an acquisition time of the performance measurement data of the network element corresponding to the performance measurement data that is not successfully acquired is acquired.

Exemplarily, to calculate the KPI information, the management device needs to acquire performance measurement data of a network element 1, a network element 2, and a network element 3. A time interval for acquiring the performance measurement data may be shorter than a time interval for calculating the KPI information. For example, the performance measurement data is acquired every one minute, and the KPI information is calculated every six minutes. In a process of acquiring the performance measurement data, the management device successfully acquires the performance measurement data from the network element 1 and the network element 2, but fails to acquire the performance measurement data from the network element 3, and the management device may determine the missing data according to the performance measurement data of the network element 3 at a preset time and use the missing data as the performance measurement data of the network element 3.

Assuming that the performance measurement data of the network element 3 in the fifth minute is not successfully acquired, the missing data is determined according to performance measurement data corresponding to an acquisition time before the fifth minute; or the missing data is determined according to performance measurement data corresponding to an acquisition time after the fifth minute; or the missing data is determined according to performance measurement data corresponding to an acquisition time before/after the fifth minute. For example, the missing data is determined according to a mean of performance measurement data in the third minute and in the fourth minute, and/or according to a mean of performance measurement data from the sixth minute to the ninth minute, or according to a mean of performance measurement data in the fourth minute and in the sixth minute.

It is to be noted that, which acquisition time before the acquisition time of the missing data is used as the first set time, and which acquisition time after the acquisition time of the missing data is used as the second set time are not limited.

How to determine the missing data according to the data at the preset time is not limited here. For example, the data at the preset time may be averaged as the missing data.

In an embodiment, determining the missing data according to the data at the preset time includes determining a mean of the data at the preset time to be the missing data.

In an embodiment, acquiring the performance measurement data includes in the case where the performance measurement data is not successfully acquired, determining a preset default value to be the missing data.

In the present application, the preset default value may also be directly determined to be the missing data. Different default values may be set for different network elements. The default value may be calculated and determined according to historical performance measurement data of the network element, and the calculation means is not limited here, as long as the default value can identify the performance of the network element.

In an embodiment, before the KPI information is determined according to the performance measurement data, the method further includes in the case where the performance measurement data includes missing data, removing identification information of the missing data to obtain new performance measurement data for calculating the KPI information.

In the present application, the KPI information may be determined according to the performance measurement data including the missing data. The missing data may include the identification information during storage, where the identification information is used for identifying the data as the missing data. Therefore, in a process of calculating the KPI information, in the case where the missing data affects the calculation of the KPI information, the identification information in the missing data may be removed first, and corresponding performance measurement data is updated with data with the identification information removed, so as to obtain new performance measurement data, where the new performance measurement data may include directly obtained performance measurement data and the missing data with the identification information removed. If the identification information is a symbol, in order that the calculation of the KPI information is not affected, after the identification information in the missing data is removed, the KPI information is calculated based on the data with the identification data removed. In the present application, after identification information of all missing data is removed, new performance measurement data is formed in conjunction with the directly obtained performance measurement data.

Exemplarily, in the case where the performance measurement data of the network element 3 is not successfully acquired, the missing data is determined, and a minus sign is added to the missing data, so as to identify the data as the missing data. Therefore, before the KPI information is calculated, the identification information of the missing data may be removed, so as to form new performance measurement data of the network element 3. Then, the KPI information is calculated in conjunction with the directly obtained performance measurement data of the network element 1 and the network element 2.

In an embodiment, determining the confidence of the KPI information includes determining a number of target data in the performance measurement data, where the target data is data other than missing data; and determining a percentage of the number of the target data to a total number of all performance measurement data required for calculating the KPI information to be the confidence of the KPI information.

The target data may be considered as real acquired data, not the missing data. The total number of all required performance measurement data may be determined based on a calculation formula required for calculating the KPI, which is not limited here.

Figure 3:
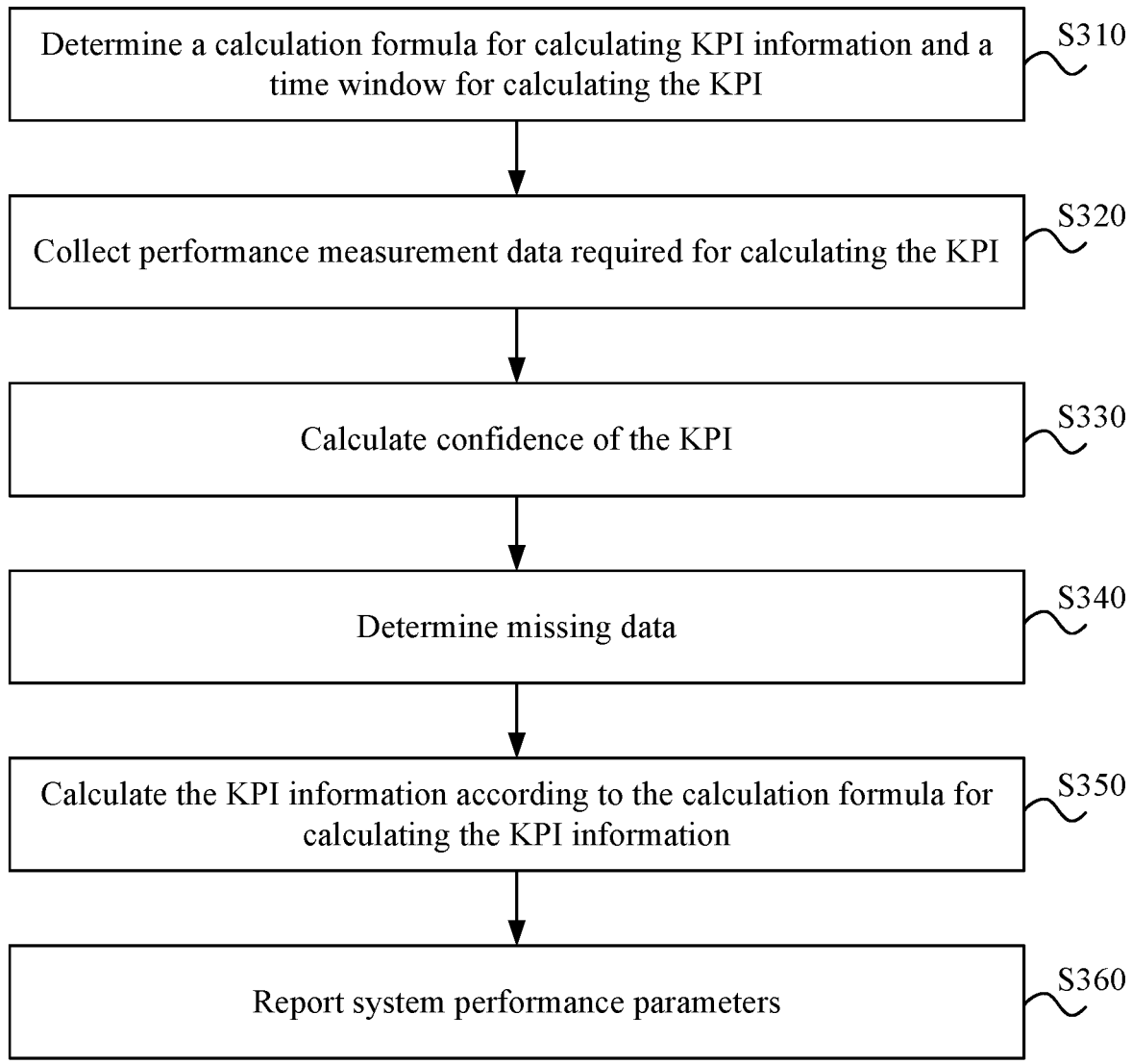
FIG. 3 is a flowchart of another method for sending system performance parameters according to an embodiment of the present application.

The following is an exemplary description of the method for sending system performance parameters provided in the present application. FIG. 3 is a flowchart of another method for sending system performance parameters according to an embodiment of the present application.

In the present application, when the KPI is calculated, the integrity of the performance measurement data used is checked first, and a calculated KPI result is identified according to an integrity rate of the performance measurement data, that is, the KPI information is identified appropriately. For example, the KPI information is identified through the confidence of the KPI information. Therefore, the user of the KPI information may have a more accurate understanding and application of the KPI. In the present application, the following problem in the mobile network management technology can be overcome: the confidence of the KPI is not identified according to the integrity of the data when the KPI is calculated, thereby affecting an accurate application of the KPI. A method is provided in which the integrity of the performance measurement data is checked before the KPI is calculated, and the confidence of the KPI is identified according to the integrity rate of the performance measurement data.

FIG. 3 is a flowchart of another method for sending system performance parameters according to an embodiment of the present application. As shown in FIG. 3, the method includes S310 to S360.

In S310, a calculation formula for calculating KPI information and a time window for calculating the KPI are determined.

In S320, performance measurement data required for calculating the KPI is collected.

In S330, confidence of the KPI is calculated.

In S340, missing data is determined.

In S350, the KPI information is calculated according to the calculation formula for calculating the KPI information.

In S360, system performance parameters are reported.

The KPI information is calculated, and KPI results, that is, the system performance parameters are reported. The KPI calculation results include KPI values, that is, the KPI information and the confidence of the KPI (the confidence is generally an integrity rate of data used for calculating the KPI). The calculation of the KPI may be performed according to a pre-defined KPI calculation formula (for the KPI and the KPI calculation formula, reference may be made to 3GPP TS 28.554). The confidence may be calculated according to the integrity of the performance measurement data used in the KPI calculation formula.

Calculating the KPI includes the following.

The KPI calculation formula and the time window for calculating the KPI are determined; the KPI calculation formula is set in a definition of the KPI (reference may be made to 3GPP TS 28.554), and the KPI definition corresponding to a KPI name included in a received KPI calculation command is searched so as to acquire the KPI calculation formula. The time window for calculating the KPI may refer to a time range for calculating the KPI, that is, the calculation of the KPI is performed according to data in which time interval. The time window is generally specified in a KPI calculation task or the KPI calculation command, which is not described in detail here.

A data type required for calculating the KPI is determined according to the KPI calculation formula, and then the performance measurement data required for calculating the KPI is collected and calculated according to the time window for calculating the KPI.

The collected data is checked for integrity so as to calculate the integrity rate of the data. The integrity rate of the data here is $$\frac{\text{Number of real data actually collected}}{\text{Number of all data required for calculating the } KPI} \times 100\%.$$

The missing data is processed. The missing data may be considered as the performance measurement data that is not successfully acquired. The processing of the missing data here may be performed in different manners according to different cases. For example, the missing data is supplemented so as to obtain the missing data. The supplement processing includes obtaining a mean of adjacent data, obtaining a default value of a data type of a network element corresponding to the missing data, and the like.

If the missing data has been supplemented during collection, but a mark is made (such as adding a minus sign), the KPI is calculated after a processing of removing the mark (such as removing the minus sign). The KPI information and the confidence of the KPI information (that is, the integrity rate of the data) are reported.

In the preceding, the calculation of the KPI is provided by a KPI calculation service or a KPI control service; the KPI calculation service or the KPI control service is generally located in a KPI calculation or KPI control function module and may also be located in a network element management module, or a subnet management module, or a network slice subnet management module, or a network slice management module.

An object of using the method described in the present application is to overcome the problem of low accuracy in calculating the KPI in the mobile network management technology. A method is provided in which the integrity of the performance measurement data is checked before the KPI is calculated, and the confidence of the KPI is identified according to the integrity rate of the performance measurement data.

Figure 4:
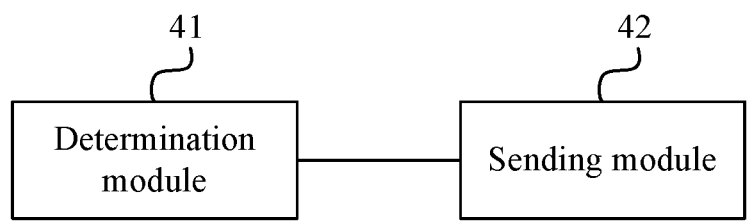
FIG. 4 is a structural diagram of an apparatus for sending system performance parameters according to an embodiment of the present application.

The present application further provides an apparatus for sending system performance parameters. FIG. 4 is a structural diagram of an apparatus for sending system performance parameters according to an embodiment of the present application. The apparatus may be integrated on a management device. As shown in FIG. 4, the apparatus provided in an embodiment of the present application includes a determination module 41 and a sending module 42. The determination module 41 is configured to determine system performance parameters, where the system performance parameters include KPI information and confidence of the KPI information. The sending module 42 is configured to send the system performance parameters.

The apparatus for sending system performance parameters provided in this embodiment is configured to perform the method for sending system performance parameters in the embodiments of the present application. The apparatus for sending system performance parameters provided in this embodiment has similar implementation principles and technical effects to the method for sending system performance parameters in the embodiments of the present application, which is not repeated here.

On the basis of the preceding embodiments, variant embodiments of the preceding embodiments are provided. It is to be noted here that for ease of description, only differences from the preceding embodiments are described in the variant embodiments.

In an embodiment, the determination module 41 includes an acquisition unit, a first determination unit, and a second determination unit.

The acquisition unit is configured to acquire performance measurement data.

The first determination unit is configured to determine KPI information according to the performance measurement data.

The second determination unit is configured to determine confidence of the KPI information.

In an embodiment, the performance measurement data includes missing data, and the missing data is the performance measurement data that is not successfully acquired.

In an embodiment, the acquisition unit is configured to, in the case where the performance measurement data is not successfully acquired, determine the missing data according to data at a preset time, where the preset time includes at least one of the following: a first set time or a second set time, where the first set time is an acquisition time corresponding to the performance measurement data acquired before an acquisition time of the missing data; and the second set time is an acquisition time corresponding to the performance measurement data acquired after the acquisition time of the missing data.

In an embodiment, in the case where the acquisition unit determines the missing data according to the data at the preset time, the acquisition unit is configured to determine a mean of the data at the preset time to be the missing data.

In an embodiment, the acquisition unit is configured to, in the case where the performance measurement data is not successfully acquired, determine a preset default value to be the missing data.

In an embodiment, the determination module 41 in the apparatus further includes a removing unit, where the removing unit is configured to, before the KPI information is determined according to the performance measurement data, in the case where the performance measurement data includes the missing data, remove identification information of the missing data to obtain new performance measurement data.

In an embodiment, the second determination unit is configured to determine a number of target data in the performance measurement data, where the target data is data other than the missing data; and determine a percentage of the number of the target data to a total number of all performance measurement data required for calculating the KPI information to be the confidence of the KPI information.

Figure 5:
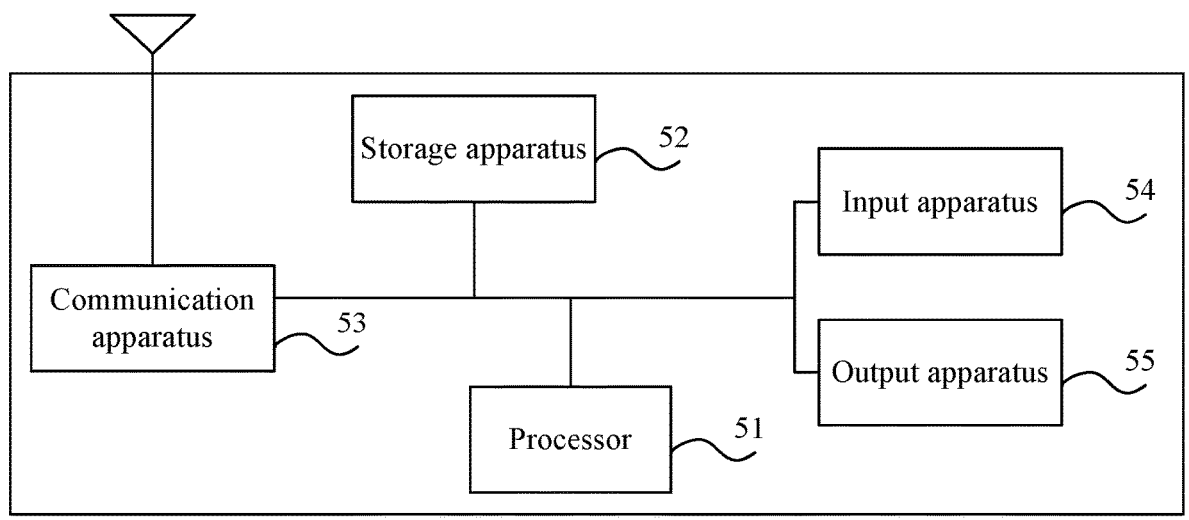
FIG. 5 is a structural diagram of a management device according to an embodiment of the present disclosure.

An embodiment of the present application provides a management device. FIG. 5 is a structural diagram of a management device according to an embodiment of the present disclosure. As shown in FIG. 5, the management device provided in the present application includes one or more processors 51 and a storage apparatus 52. One or more processors 51 are provided in the management device. In FIG. 5, one processor 51 is used as an example. The storage apparatus 52 is configured to store one or more programs. The one or more programs are executed by the one or more processors 51 to cause the one or more processors 51 to perform the method in the embodiments of the present application.

The management device further includes a communication apparatus 53, an input apparatus 54, and an output apparatus 55.

The one or more processors 51, the storage apparatus 52, the communication apparatus 53, the input apparatus 54, and the output apparatus 55 that are in the management device may be connected through a bus or in other manners. In FIG. 5, the connection through the bus is used as an example.

The input apparatus 54 may be used for receiving inputted digital or character information and for generating key signal input related to user settings and function control of the management device. The output apparatus 55 may include a display device, for example, a display screen.

The communication apparatus 53 may include a receiver and a transmitter. The communication apparatus 53 is configured to perform information transceiving and communication under the control of the one or more processors 51. The information includes, but is not limited to, system performance parameters.

As a computer-readable storage medium, the storage apparatus 52 may be configured to store software programs, computer-executable programs and modules, such as program instructions/modules (for example, the determination module 41 and the sending module 42 that are in the apparatus for sending system performance parameters) corresponding to the method according to the embodiments of the present application. The storage apparatus 52 may include a program storage region and a data storage region. The program storage region may store an operating system and an application program required by at least one function. The data storage region may store data created depending on the use of the management device. Additionally, the storage apparatus 52 may include a high-speed random-access memory and may further include a nonvolatile memory, such as at least one disk memory, a flash memory, or another nonvolatile solid-state memory. In some examples, the storage apparatus 52 may include memories located remotely relative to the one or more processors 51, and these remote memories may be connected to the management device via a network. Examples of the preceding network include, but are not limited to, the Internet, an intranet, a local area network, a mobile communication network, and a combination thereof.

An embodiment of the present application further provides a storage medium for storing computer programs which, when executed by a processor, perform the method for sending system performance parameters according to any embodiment of the present application. The method includes determining system performance parameters, where the system performance parameters include KPI information and confidence of the KPI information; and sending the system performance parameters.

A computer storage medium in the embodiments of the present application may use any combination of one or more computer-readable media. Computer-readable media may be computer-readable signal media or computer-readable storage media. For example, the computer-readable storage medium may be, but is not limited to, an electrical, magnetic, optical, electromagnetic, infrared or semiconductor system, apparatus or device or any combination thereof. The computer-readable storage medium includes an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory, a magnetic memory or any suitable combination thereof. The computer-readable storage medium may be any tangible medium including or storing a program. The program may be used by or used in conjunction with an instruction execution system, apparatus, or device.

The computer readable signal medium may include a data signal propagating in baseband or as part of a carrier wave. The computer readable signal medium carries computer readable program codes. The data signal propagated in this manner may be in multiple forms and includes, and is not limited to, an electromagnetic signal, an optical signal, or any suitable combination thereof. The computer-readable signal medium may also be any computer-readable medium except the computer-readable storage medium. The computer-readable medium may send, propagate or transmit the program used by or used in conjunction with the instruction execution system, apparatus or device.

The program codes contained in the computer-readable medium may be transmitted by using any appropriate medium. The appropriate medium includes, but is not limited to, wireless, a wire, an optical fiber, radio frequency (RF) and the like, or any appropriate combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. Program codes may be executed entirely on a user computer, partly on the user computer, as a standalone software package, partly on the user computer and partly on a remote computer, or entirely on the remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The preceding embodiments are only example embodiments of the present application and are not intended to limit the scope of the present application.

It is to be understood by those skilled in the art that the term "terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logics or any combination thereof. For example, some aspects may be implemented in hardware while other aspects may be implemented in firmware or software that can be executed by a controller, a microprocessor or other computing apparatuses though the present application is not limited thereto.

Embodiments of the present application may be implemented by computer program instructions executed by a data processor of a mobile apparatus, for example, in a processor entity, hardware or a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for the local technical environment and may be implemented using any suitable data storage technology, such as, but not limited to, a read-only memory (ROM), a random-access memory (RAM) and an optical memory device and system (a digital video disc (DVD), or a compact disc (CD)). The one or more computer-readable media may include a non-transitory storage medium. The data processor may be of any type suitable for the local technical environment, such as, but not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A method for sending system performance parameters, comprising:
   determining system performance parameters which comprise key performance indicator (KPI) information and confidence of the KPI information; and
   sending the system performance parameters;
   wherein determining the system performance parameters comprises: acquiring performance measurement data which comprises missing data, wherein the missing data is performance measurement data that is not successfully acquired; determining the KPI information according to the performance measurement data, and determining the confidence of the KPI information;
   wherein acquiring the performance measurement data comprises: in response to the performance measurement data being not successfully acquired, determining the missing data according to data at a preset time, wherein the preset time comprises at least one of the following: a first set time which is an acquisition time corresponding to the performance measurement data acquired before an acquisition time of the missing data, or a second set time which is an acquisition time corresponding to the performance measurement data acquired after the acquisition time of the missing data.

2. The method of claim 1, wherein determining the missing data according to the data at the preset time comprises:
   determining a mean of the data at the preset time to be the missing data.

3. The method of claim 1, wherein acquiring the performance measurement data comprises:
   in response to the performance measurement data being not successfully acquired, determining a preset default value to be the missing data.

4. The method of claim 1, before determining the KPI information according to the performance measurement data, further comprising:
   in response to the performance measurement data comprising missing data, removing identification information of the missing data to obtain new performance measurement data.

5. The method of claim 1, wherein determining the confidence of the KPI information comprises:

determining a number of target data in the performance measurement data, wherein the target data is data other than missing data; and determining a percentage of the number of the target data to a total number of all performance measurement data required for calculating the KPI information to be the confidence of the KPI information.

6. A management device, comprising:

one or more processors; and a storage apparatus configured to store one or more programs;

wherein the one or more programs are executed by the one or more processors to cause the one or more processors to:

determine system determine system performance parameters which comprise key performance indicator (KPI) information and confidence of the KPI information; and send the system performance parameters;

wherein the one or more processors determine the system performance parameters by:

acquiring performance measurement data which comprises missing data, wherein the missing data is performance measurement data that is not successfully acquired; determining the KPI information according to the performance measurement data; and determining the confidence of the KPI information;

wherein the one or more processors acquire the performance measurement data by: in response to the performance measurement data being not successfully acquired, determining the missing data according to data at a preset time, wherein the preset time comprises at least one of the following: a first set time which is an acquisition time corresponding to the performance measurement data acquired before an acquisition time of the missing data; or a second set time which is an acquisition time corresponding to the performance measurement data acquired after the acquisition time of the missing data.

7. The device of claim 6, wherein the one or more processors determines the missing data according to the data at the preset time by:

determining a mean of the data at the preset time to be the missing data.

8. The device of claim 6, wherein the one or more processors acquire the performance measurement data by:

in response to the performance measurement data being not successfully acquired, determining a preset default value to be the missing data.

9. The device of claim 6, before the one or more processors determine the KPI information according to the performance measurement data, the one or more processors further perform the following:

in response to the performance measurement data comprising missing data, removing identification information of the missing data to obtain new performance measurement data.

10. The device of claim 6, wherein the one or more processors determine the confidence of the KPI information by:

determining a number of target data in the performance measurement data, wherein the target data is data other than missing data; and determining a percentage of the number of the target data to a total number of all performance measurement data required for calculating the KPI information to be the confidence of the KPI information.

11. A non-transitory computer-readable storage medium for storing computer programs which, when executed by a processor, implement the followings:

determining system performance parameters which comprise key performance indicator (KPI) information and confidence of the KPI information; and sending the system performance parameters;

wherein determining the system performance parameters comprises: acquiring performance measurement data which comprises missing data, wherein the missing data is performance measurement data that is not successfully acquired; determining the KPI information according to the performance measurement data; and determining the confidence of the KPI information;

wherein acquiring the performance measurement data comprises: in response to the performance measurement data being not successfully acquired, determining the missing data according to data at a preset time, wherein the preset time comprises at least one of the following: a first set time which is an acquisition time corresponding to the performance measurement data acquired before an acquisition time of the missing data; or a second set time which is an acquisition time corresponding to the performance measurement data acquired after the acquisition time of the missing data.

* * * * *